United States Patent [19]

Hall

[11] 3,841,228
[45] Oct. 15, 1974

[54] TRACTION DRIVE SUSPENSION SYSTEM FOR A RAIL VEHICLE

[75] Inventor: Walter O. Hall, Pittsburgh, Pa.

[73] Assignee: Westinghouse Electric Corporation, Pittsburgh, Pa.

[22] Filed: Nov. 20, 1973

[21] Appl. No.: 417,690

[52] U.S. Cl.................. 105/108, 105/131, 105/136
[51] Int. Cl............................................. B61c 9/00
[58] Field of Search............ 105/96.1, 97, 108, 113, 105/131, 133, 136, 139, 218 R, 60, 62, 65 R

[56] References Cited
UNITED STATES PATENTS

| | | | |
|---|---|---|---|
| 1,987,419 | 1/1935 | Ross.................................. | 105/108 |
| 2,290,643 | 7/1942 | Kjolseth............................. | 105/131 |
| 3,468,389 | 9/1969 | Nelson.............................. | 105/108 X |
| 3,602,153 | 8/1971 | Korn................................. | 105/136 X |

Primary Examiner—M. Henson Wood, Jr.
Assistant Examiner—John J. Love
Attorney, Agent, or Firm—R. G. Brodahl

[57] ABSTRACT

A resilient suspension system for a motor gearbox assembly on a rail vehicle truck which allows the assembly to freely follow axle motion while reducing the forces which act on the resilient coupling between the driving gear and the axle. The motor portion of the assembly is coupled to the truck frame in the usual manner, and the gearbox portion of the assembly includes gearbox extensions which circumferentially enclose the driving wheel axle and which are resiliently supported by the journal bearing housings which receive the respective ends of one of the driving wheel axles. The journal bearing housings therefore support the weight of the gearbox housing which permits the coupling between the driving gear and the axle to respond essentially only to the motor torque thereby reducing the wear and tear on the coupling.

8 Claims, 4 Drawing Figures 3,841,228

TRACTION DRIVE SUSPENSION SYSTEM FOR A RAIL VEHICLE

CROSS REFERENCE TO RELATED APPLICATIONS

Reference is made to copending application entitled "A Resilient Mounting For A Traction Drive Suspension System", Ser. No. 396,268, filed Sept. 11, 1973 on behalf of Walter O. Hall and Charles A. Yuhas. The referenced application is assigned to the assignee of the present invention.

BACKGROUND OF THE INVENTION

In the prior art, the gearbox portion of a motor gearbox assembly is resiliently coupled to the driving wheel axle of a vehicle truck by a rubber coupling or other usual coupling device, and the motor portion of the assembly is secured to the frame of the vehicle truck by a vertical support member and a lateral stabilizing element which acts in the horizontal. In such an arrangement the resilient coupling between the driving gear and the driving wheel axle is subject to excessive wear and tear and even failure due to the large relative motion between the axle and the truck, since the coupling supports the weight of the gearbox assembly as well as responding to the torque of the motor.

According to the present invention, gearbox extensions are included which are resiliently supported by the journal bearing housings on each end of the driving wheel axle which support the weight of the gearbox assembly and thereby permits the gearbox to freely follow axle motions, which in turn reduce the wear and tear on the resilient coupling between the driving gear and the driving wheel axle due to the resilient coupling not having to support the weight of the gearbox assembly.

SUMMARY OF THE INVENTION

A suspension system for a rail vehicle truck with wheels attached thereto, with first and second bearing housings attached to the truck, each including a plurality of bearings for rotatably receiving one of the axles. A motor includes a motor shaft, with the motor being resiliently mounted on the truck. Included is a gearbox assembly having a housing and an output shaft, and including means for coupling the gearbox output shaft to the motor shaft. The output shaft of the gearbox assembly is also coupled to the one axle, and there are means included for resiliently coupling the gearbox housing to the first and second bearing housings.

DESCRIPTION OF THE PREFERRED EMBODIMENT

Figure 1:
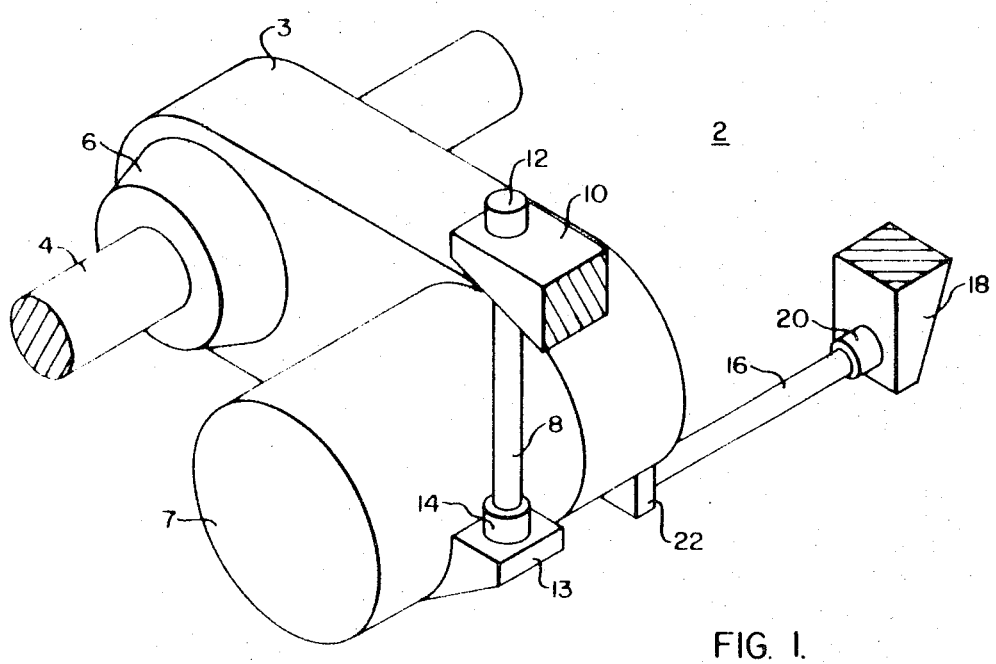
FIG. 1 illustrates a traction drive suspension system according to the prior art.

FIG. 1 illustrates a traction drive suspension system known in the prior art. A motor gearbox assembly 2 has the gearbox portion 3 of the assembly resiliently coupled to an axle 4 of a vehicle (not shown) by way of a resilient coupling 6. The resilient coupling 6 couples the driving gear of the gearbox assembly to the driving wheel axle for applying torque to the axle, in addition to supporting the weight of the gearbox assembly on the axle. It is seen therefore that the resilient coupling is subject to excessive forces due to the axle following the irregularities of the rail surface over which the vehicle travels. For example, if the axle 4 is deflected in an upward direction, the coupling 6 is forced against the downwardly directed weight of the gearbox assembly. The motor portion 7 of the assembly is supported in the vertical direction by a support member such as the rod 8 which is coupled to a truck frame bracket 10 by a rubber bushing 12. The support member 8 is connected to a flange 13 on the motor by means of a rubber bushing 14. The motor is supported in the horizontal by a lateral stabilizer element such as the rod 16 which is connected to a truck frame bracket 18 by a rubber bushing 20, and to a flange 22 on the motor by a bushing (not shown).

Figure 2:
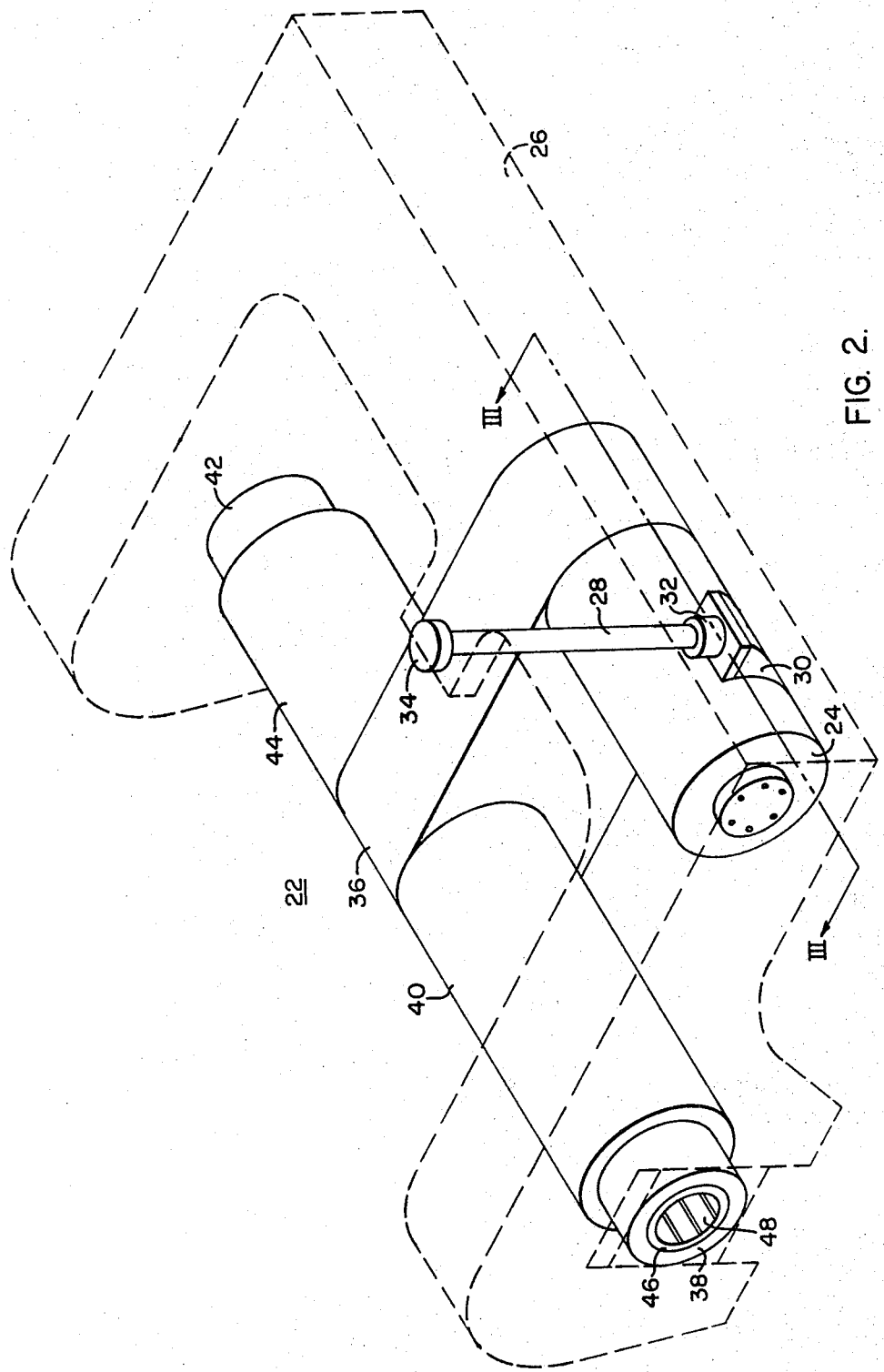
FIG. 2 illustrates a traction drive suspension system according to the present invention.

Refer now to FIG. 2 which illustrates a traction drive suspension system according to the present invention. A motor gearbox assembly 22 has the motor portion 24 thereof supported on the truck frame 26 (shown in phantom) by way of a load carrying link 28 which is connected to a flange 30 on the motor by way of a bushing 32 and to the truck frame 26 by a bushing 34. The motor may be supported by other suitable members, such as the diamond shaped pin arrangement illustrated in FIG. 4 and which is described in detail in referenced patent application Ser. No. 396,268. The gearbox portion 36 of the assembly has attached to one side thereof a gearbox extension 40 which is resiliently supported by bearing housing 38. A gearbox extension 44 is attached to the other side of gearbox 36 and is resiliently supported by bearing housing 42. The bearing housing 38 includes a plurality of bearings 46 which rotatably receives an axle 48. The bearing housing 42 also includes a plurality of bearings for rotatably receiving the other end of the axle 48. The gearbox extensions 40 and 42 support the weight of the gearbox assembly and follow the movement of the axle 48, which reduces the wear and tear between the coupling from the driving gear (not shown) and the resilient coupling (not shown) between the driving gear and the axle.

Figure 3:
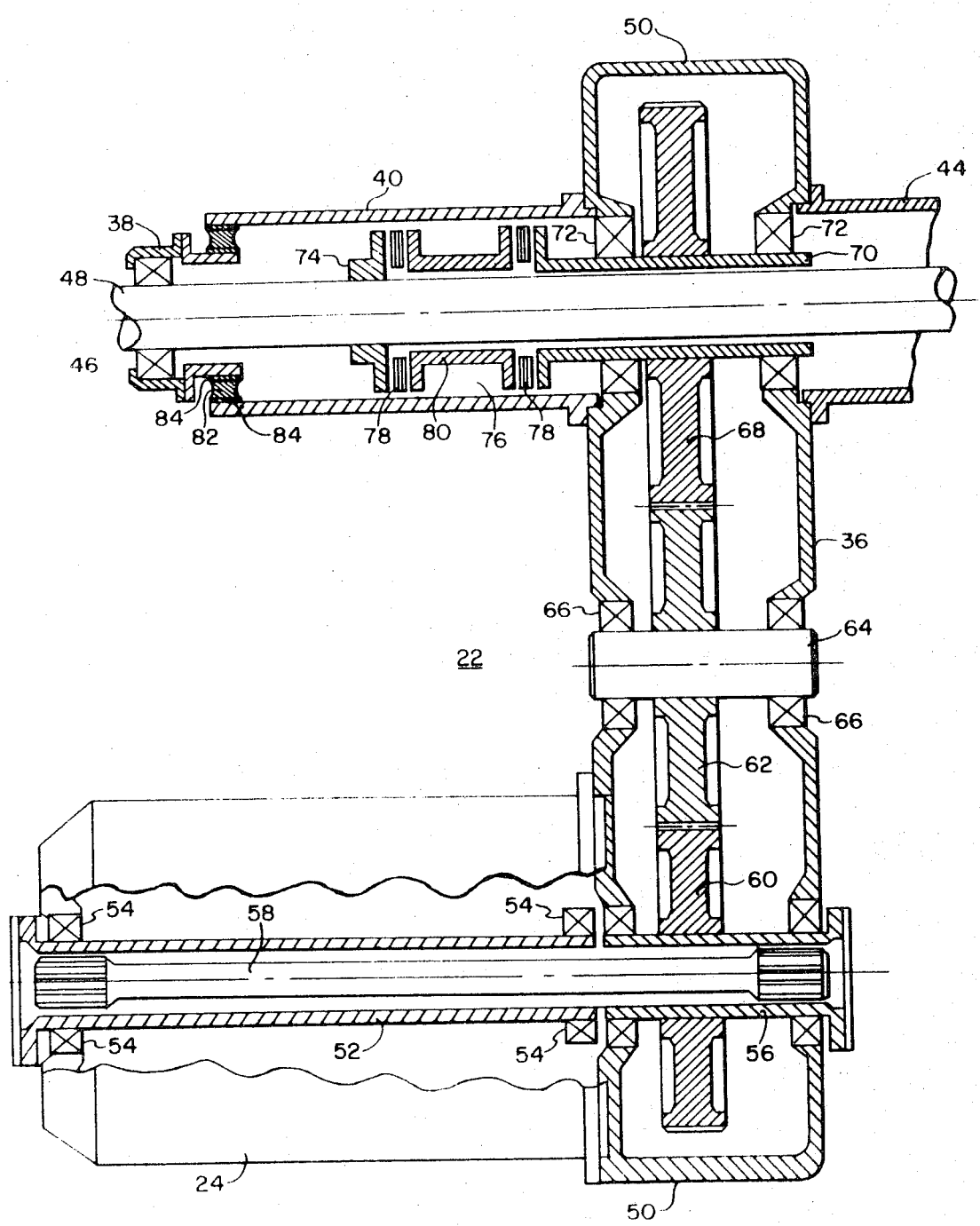
FIG. 3 is a plan view in section taken along the lines III—III of FIG. 2.

Refer now to FIG. 3, wherein the motor 24 is illustrated as being secured to the gearbox housing 50 of the gearbox assembly 36 by any suitable fastening means, such as bolts (not shown). The motor drive shaft 52 rotates on bearings 54 and is coupled to the input shaft 56 of the gearbox 36 by a torsionally flexible element such as the quill shaft 58. This type of coupling is shown for purposes of illustration only and any other type of suitable coupling may be used. For example, a flexible gear type coupling may be used where there is no requirement for torsional resiliency. A high speed gear 60 is coupled to the shaft 56 and engages an intermediate gear 62 which turns on an idler shaft 64 which rotates on bearings 66. The gear 62 engages a low speed gear 68 which is affixed to the output shaft 70 of the gearbox assembly and which rotates on bearings 72. A coupling hub 74 is affixed to the axle 48 and is resiliently coupled to the shaft 70 by way of a resilient coupling such as the flexing disc 76 which is comprised of a plurality of steel sheets 78 which are secured on one end to the coupling hole 74 and on the other end to the shaft 70. Intermediate the steel sheets 78 is situated a steel connecting member 80. In practice the coupling 76 may take other forms such as a resilient rubber coupling or even a flexible gear type coupling could be used if resiliency is not required between the axle and the gearbox output shaft. The gearbox extensions 40 and 44 are secured to the gearbox housing 50 by any suitable fastening means such as bolts (not shown). The extension 40 is supported on the bearing housing 38 by means of a resilient coupling such as the rubber support member 82 which may be lined on its outer edges by a steel backing 84. Also, the resilient supporting member 82 could be comprised of alternating layers of rubber, metal, rubber and so on. Other suitable spring type devices may be used. The extension 44 is supported in a like manner by the housing 42 (not shown).

It is seen that the bearing housing 38 on the one end of the axle assembly, and the other bearing housing 42 (not shown) support the weight of the gearbox assembly. If the axle 48 were to deflect in an upward direction in response to a rail irregularity the gearbox housing follows the axle motion and there would be little if any force exerted on the resilient coupling 76 due to the deflection of the axle since the weight of the gearbox assembly is supported by the bearing housings. It is seen, therefore, that the coupling 76 responds essentially only to the torque of the motor and is not subject to forces from the weight of the gearbox housing as was the case in the prior art.

Figure 4:
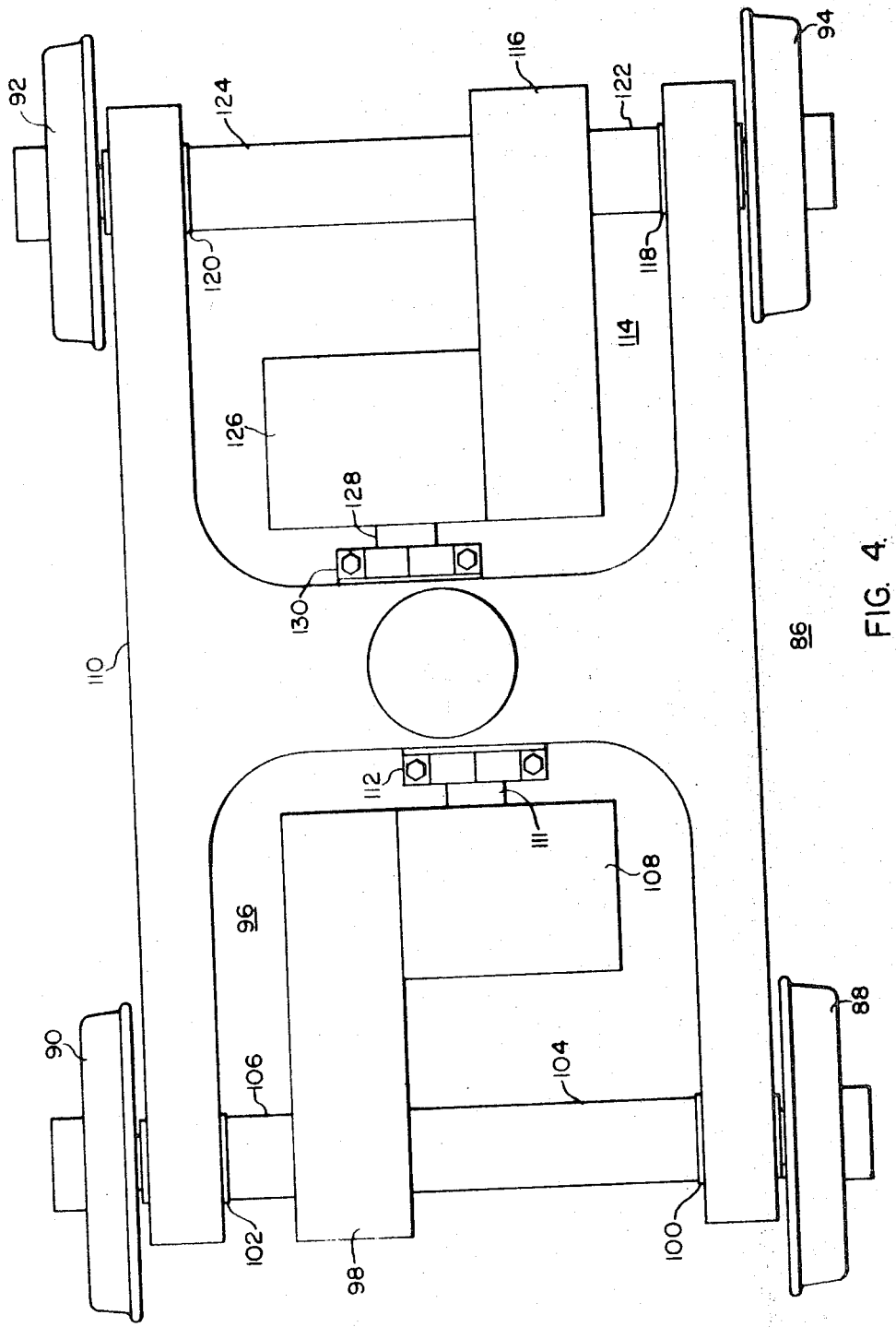
FIG. 4 is a plan view of a vehicle truck including a traction drive suspension system according to the present invention.

FIG. 4 illustrates a plan view of a vehicle truck in which two motor gearbox assemblies are coupled to the respective axles of the vehicle and are resiliently supported by the truck frame on the one end and by the gearbox extensions on the other end according to the present invention. A vehicle truck 86 has four wheels 88, 90, 92 and 94 mounted in spaced pairs on axles, the ends of which are rotatably received within the usual journal bearings. Auxiliary bearings would be used in place of journal bearings for an outside journal bore. A motor gearbox assembly 96 has the gearbox portion 98 thereof resiliently supported on the journal bearing housings 100 and 102 by way of extensions 104 and 106, respectively. The motor portion 108 is resiliently coupled to the truck frame 110 by way of a diamond shaped pin 111 in cross section and a bracket support assembly 112 which has an aperture therein which is complementary in shape to the shaped pin 111, and which has elastomeric pads seated in the periphery of the aperture for housing and resiliently supporting the pin 111. As was previously stated, this is disclosed in referenced patent application Ser. No. 396, 268. On the opposite end of the truck a motor gearbox assembly 114 has the gearbox portion 116 thereof resiliently supported by the journal bearing housings 118 and 120 by way of extensions 122 and 124, respectively. The motor portion 126 of the assembly is coupled to the frame 110 by way of a diamond shaped pin 128 and a bracket support assembly 130 in a manner similar to which the motor 108 was supported.

In summary, a motor gearbox suspension system has been disclosed in which the resilient coupling between the driving gear and the driving wheel axle of the vehicle responds essentially only to the torque of the driving motor, since the gearbox housings weight is supported on the journal bearing housings by way of gearbox extensions.

I claim:

1. In a suspension system for a rail vehicle truck having a plurality of axles with wheels attached thereto, the combination comprising:
   first and second bearing housings attached to said truck, each including a plurality of bearings for rotatably receiving one of said axles;
   a motor including a motor shaft, said motor being resiliently mounted on said truck;
   a gearbox assembly having a housing and an output shaft, and including means for coupling the gearbox output shaft to said motor shaft.
   means for coupling the output shaft of said gearbox assembly to said one axle; and
   means for resiliently coupling the gearbox housing to said first and second bearing housings.

2. The combination claimed in claim 1, wherein said means for coupling the gearbox output shaft to said one axle comprises a flexing disc coupling.

3. The combination claimed in claim 2, wherein said means for coupling the gearbox output shaft to said motor shaft includes a plurality of gears, with said gears being coupled to said motor output shaft by a torsionally flexible shaft.

4. The combination claimed in claim 3, wherein said torsionally flexible shaft comprises a quill shaft.

5. In a suspension system for a rail vehicle truck having a plurality of axles with wheels attached thereto, the combination comprising:
   first and second bearing housings attached to said truck, each including a plurality of bearings for rotatably receiving one of said axles;
   a gearbox having a housing and including an input shaft coupled to an output shaft by a plurality of gears;
   means for coupling the gearbox output shaft to one of said axles;
   a motor having an output shaft, said motor being resiliently mounted to said truck;
   means for coupling the output shaft of said motor to the input shaft of said gearbox; and
   means for resiliently coupling said gearbox housing to said first and second bearing housings.

6. The combination claimed in claim 5, wherein said means for coupling the gearbox output shaft to one of said axles comprises a flexing disc coupling.

7. The combination claimed in claim 6, wherein said means for coupling the output shaft of said motor to the input shaft of said gearbox comprises a torsionally flexible shaft.

8. The combination claimed in claim 7, wherein said means for resiliently coupling said gearbox housing to said first and second bearing housings comprises gearbox housing extensions extending from said gearbox housing and circumferentially enclosing said one axle and being resiliently supported on said first and second bearing housings.

* * * * *